United States Patent [19]

Gore et al.

[11] Patent Number: 5,233,861
[45] Date of Patent: Aug. 10, 1993

[54] APPARATUS AND METHOD FOR IN SITU CALIBRATION OF A METERING DEVICE

[75] Inventors: Raymond P. Gore, Mesa; James E. Park, Tempe, both of Ariz.

[73] Assignee: Motorola, Inc., Schaumburg, Ill.

[21] Appl. No.: 620,691

[22] Filed: Dec. 3, 1990

[51] Int. Cl.⁵ .......................................... G01F 25/00
[52] U.S. Cl. ....................................................... 73/3
[58] Field of Search ................ 73/3, 861.67, 1 R, 1 G

[56] References Cited

U.S. PATENT DOCUMENTS

| | | | |
|---|---|---|---|
| 4,069,948 | 1/1978 | Saaty et al. | 73/3 |
| 4,271,694 | 6/1981 | Pearman | 73/3 |
| 4,290,298 | 9/1981 | Severson | 73/3 |
| 4,341,107 | 7/1982 | Blair et al. | 73/3 |
| 4,965,756 | 10/1990 | Pearman et al. | 73/3 |

Primary Examiner—Hezron E. Williams
Assistant Examiner—Nashimya Ashraf
Attorney, Agent, or Firm—Joe E. Barbee

[57] ABSTRACT

An apparatus and method for in situ calibration of a metering device (21) in a gas manifold or plumbing system. A calibrated gas source and inlet (17) are provided. Connected to the calibrated gas source is a first three way valve. The first three way valve is connected to an inlet of the metering device (21) with an outlet connected to a second three way valve. The second three way valve is connected to both a reaction chamber or an exhaust. A calibration gas is allowed to flow through the calibration inlet (17), through the first three way valve, through the metering device (21), and through the second three way valve so as to calibrate the metering device to the calibrated gas source.

2 Claims, 1 Drawing Sheet

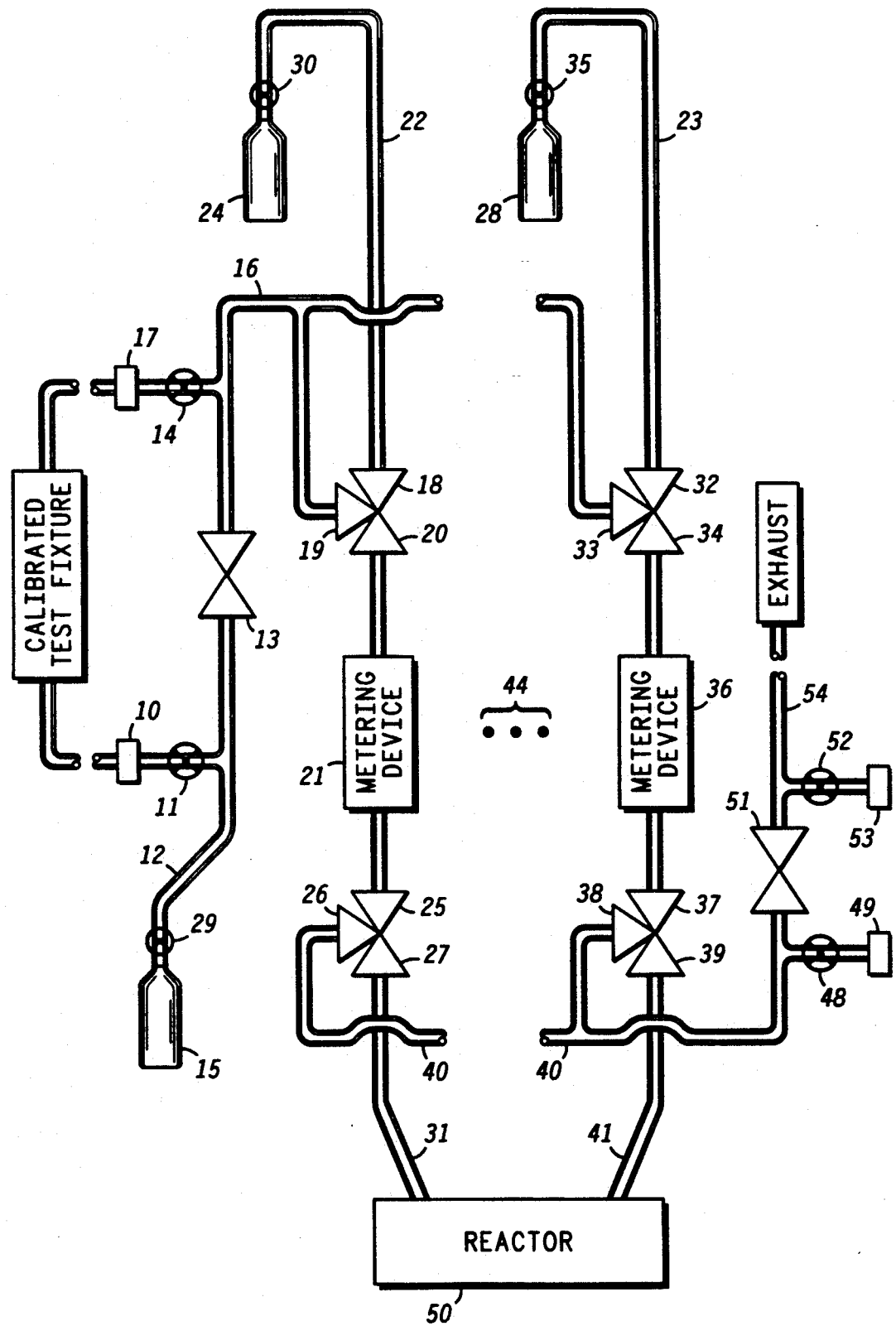

APPARATUS AND METHOD FOR IN SITU CALIBRATION OF A METERING DEVICE

BACKGROUND OF THE INVENTION

This invention relates, in general, to gas plumbing systems, and more particularly, to testing of the gas plumbing systems in vacuum systems.

Gas plumbing systems, gas manifold, or gas jungles have been used for a long time in a large number of industries. Gas jungles in the semiconductor industry are used extensively in a wide variety of equipment types such as chemical vapor deposition systems, etching systems, implanters, or the like. With increasing demands for greater productivity, fewer equipment failures, and less contamination, conventional maintenance procedures and methods are not adequate to meet these new stringent demands.

Conventional maintenance and trouble shooting of gas plumbing systems is a long, laborious, and costly procedure. Generally, for all gas related problems the equipment that is associated with the gas system has got to be taken out of production. The gas system is evacuated of all process gases and the entire system is checked for leaks. A determination as to exactly where and what has caused the gas related problem is then undertaken. Problems can be caused by a variety of items such as a contaminated gas source, a leak, a component failure, or the like.

Conventionally, if a component is suspected of being in need of repair or calibration it is removed from the gas jungle system to be tested, repaired and calibrated. Many times however, mistakes are made in diagnosing problems that result in removal of components in gas plumbing system that need not have been removed. The removal of components or parts of the plumbing system allows moisture and contaminated gases to be introduced into the system which contaminate inside surfaces of the gas plumbing system. This environmental contamination of the plumbing system can cause other problems when a process gas is reactive with the environmental contaminant. Thus, the removal of components results in lost production time, compromising the integrity of the system, and may result in causing a potential problem with reactions between process gas or gases and environmentally contaminated surfaces in the plumbing system.

Additionally, there is no method that allows for the in situ testing or calibration of a metering device. If the metering device is suspected of repair or calibration it is removed from the gas system and calibrated on a calibrated test fixture. Removal of the metering device results in all of the aforesaid problems.

Currently, there is not an easy method or apparatus to measure defectivity or particle levels that are associated with the process gases, gas manifold system, or gas jungle system. Generally, components of the gas system have to be taken apart in order to test for particle levels. When a defectively problem is suspected the equipment is removed from production and tested which typically involves breaking the vacuum integrity of the system.

Problems also exist with being able to sample, verify, and characterize gases that go through the gas system or jungle.

It should be evident that an apparatus and method that would allow in situ flow calibration, leak detection, particle checking and an ability to sample and verify gas quality would be very desirable.

SUMMARY OF THE INVENTION

Briefly stated, the present invention is provided by an improved method and apparatus for in situ calibration of a metering device. A calibrated gas source and inlet are provided. The inlet allows for the connection of the calibrated gas source to a first three way valve. The first three way valve is connected to the calibrated gas source by the inlet, another gas source, and a metering device. The metering device is connected to a second three way valve. The second three way valve is connected to the metering device, an exhaust, and a reaction chamber. Calibration gases are allowed to flow through the calibrated gas inlet, through the first three way valve, through the metering device, through the second three way valve, and through either the reaction chamber or the exhaust in such a manner that the metering device is calibrated to the calibrated gas. Additionally, this invention is used for leak detection, particle detection, and sampling of gases so that gas characterization is accomplished.

BRIEF DESCRIPTION OF THE DRAWING

A single FIGURE illustrates a pictorial diagram of a portion of a gas system in accordance with the present invention.

DETAILED DESCRIPTION OF THE DRAWING

Illustrated in the single FIGURE is an example of a portion of a gas system. In a semiconductor manufacturing facility gas systems are generally built to regulate and transport process gases from a storage location to a reaction chamber of some sort. Some process gases that are presently used in manufacturing can be extremely toxic which increases the necessity to minimize opening and closing of the gas plumbing system. Gas systems that are built for todays semiconductor manufacturing environment are generally made of stainless steel tubing or the like.

Gas source 15 is typically nitrogen, argon, or the like. Gas source 15 is connected to cut off valve 29. Cut off valve 29 is connected to gas tube 12 which is connected to valve 11 and valve 13. Valve 11 and 13 are typically, a quarter turn hand valve and an air actuated two way valve, respectively. Outlet 10 is connected to valve 11 which provides an outlet for gas source 15. Valve 13 is connected to valve 14 by tube 16 and to a three way valve having valve components 18, 19, and 20. Tube 16 provides a continuous connection from valves 13 and 14 to a plurality of the first three way valves. Valve 14 is connected to a gas inlet 17. Valve 14 is typically a quarter turn hand valve. Inlet 17 allows for injection of a different gas or gases into the gas system without the need to open or compromise the integrity of the gas plumbing system.

The first three way valve having valves 18, 19, and 20 is connected to tube 16 by valve 19. Valve 18 is connected to process gas tube 22. Process gas tube 22 is connected to cut off valve 30 which is connected to process gas source 24. Process gas sources 24, typically, can be a wide variety of gases depending on the equipment type and the process that a particular gas is going to be needed for. Valve 20 is connected to metering device 21. It should be understood that valve 20 can also be a port that is not valved.

Metering device 21, with at least an inlet and an outlet, is a device which regulates gas flow through the gas system. Generally, metering device 21 is a mass flow controller (MFC), rotometer, or the like. MFC's are electronically regulated metering devices and go out of calibration from time to time. This results in unknowingly receiving a wrong amount of gas from the MFC.

A second three way valve having valves 25, 26 and 27 is connected to metering device 21 by valve 25. Valve 26 is connected to an exhaust 54 through exhaust tube 40 and valve 51. Exhaust 54 is generally created either by a facilities vacuum source or by a vacuum pump that is associated with the equipment system. Valve 27 is connected to process gas tube 31 which typically connects to a reactor 50. It should be understood that valve 25 can also be a port that is not valved.

Three way valve having valves 32, 33, and 34 is connected to valves 13 and 14 by valve 33 through a continuation of tube 16. Valve 32 is connected to process gas tube 23. Process gas tube 23 is connected to a cut off valve 35. Cut off valve 35 is connected to a process gas source 28. Valve 34 is connected to a metering device 36. It should be understood that valve 34 can also be a port that is not valved. Metering device 36 controls the flow of gas through a three way valve having valves 37, 38, and 39. Valve 38 is connected to exhaust 54 through exhaust tube 40 and valve 51. Valve 39 controls gas flow to process gas tube 41 which typically is connected to reactor 50. It should be understood that valve 37 can also be a port that is not valved.

It should be understood that the first three way valve having 18, 19, and 20, the metering device, and the second three way valve having 25, 26, and 27 are repeating units. These units can be repeated as many times as necessary so as to deliver as many gases as are necessary for a particular system. These repeating units are illustrated by dots 44 which illustrate plumbing continuation from tube 16, first three way valve set, metering device, second three way valve set, and continuation of tube 40.

Exhaust tube 40 is connected to valve 51 and valve 48. Valve 51 and valve 48 are typically, an air actuated two way valve and a quarter turn hand operated valve respectively. Valve 48 is further connected to outlet or port 49. Valve 51 is connected to exhaust 54, as well as to valve 52. Valve 52 is connected to test outlet 53. It should be understood that having additional test outlets along exhaust tube 40 offer advantages in simultaneously testing the gas plumbing system.

By having an appropriate valve configuration it is now possible to accomplish in situ testing and calibration of all the metering devices such as 21 and 36. Gas source 15 and an external calibrating test fixture are used for this purpose. The external calibrating test fixture is generally a standard MFC which is used to calibrate an uncalibrated gas source (gas source 15) into a known quantity Typically, the uncalibrated gas source is regulated and calibrated into cubic centimeters or cubic liters per minute. Prior to opening or closing of any valves the calibrating test fixture is attached to outlet 10 and inlet 17. By way of example, to calibrate metering device 21 a gas from an uncalibrated source 15 is allowed to flow through outlet 10 by having valve 13 closed and valve 11 open. The gas from uncalibrated gas source 15 is received by the calibrating test fixture which regulates uncalibrated gas source 15 into a calibrated gas. After uncalibrated gas source 15 is calibrated by the calibrating test fixture the calibrated gas is injected into inlet 17 with valve 14 open. The calibrated gas travels through inlet 17, open valve 14, and into tube 16. Tube 16 is connected to valve 19 of the first three way valve. Valve 19 is open, valve 18 is closed, and valve 20 is open to metering device 21. The calibrated gas flows through tube 16, open valve 19 and 20, metering device 21, and in through valve 25 of the second three way valve. The calibrated gas can then either flow through valve 26 into exhaust 54 or through valve 27 and into reactor 50. By having a known calibrated gas source flowing from the calibrating test fixture, metering device 21 is calibrated to the calibrated gas. This calibration is done without having to remove metering device 21, thereby not opening or compromising the gas system. Additionally, this in situ ability eliminates guessing as to whether the metering device is in need of repair, in need of calibration, or is acting normally without removing any gas system components. It should be understood that calibration of any number of metering devices represented by dots 44 can be done in a similar manner Sampling of gases to verify quality of the gas cannot be done with conventional gas systems By using the present invention an ability to sample gas is provided. By way of example, process gas from source 24 is allowed to flow through first three way valve by having valve 18 and valve 20 opened while valve 19 is closed. Metering device 21 flows process gas 24 into exhaust tube 40 by having valve 25 and valve 26 open and valve 27 closed. The process gas is allowed to flow through exhaust tube 40. Several different combinations of using outlets or ports 53 and 49 can be used such as opening valve 48 and collecting gas at outlet or port 49. It should be understood that ports 49 and 53 can both be used simultaneously. It should be further understood that sampling of any gas from any of the repeating units can be done.

Monitoring of particle levels in most equipment is a necessity for building high quality products Identification of particle sources, statistically controlling and monitoring their levels is important to avoid catastrophic problems which results in scrapping the product. By using this invention an ability is provided to monitor and characterize the particle levels in the gas system. By way of example, a known quantifiable clean gas is injected into inlet 17 with valve 14 open and valve 13 closed. Clean gas, flows into and through tube 16 into the first three way valve which has valve 19 open. Valve 18 is closed. Valve 20 is open to metering device 21 so as to allow the flow of clean gas to enter the second three way valve. Valve 25 and valve 26 are open so as to allow clean gas to flow into tube 40. Valve 27 is closed. Valve 51 is generally closed so as to divert clean gas into open valve 48 and into outlet or port 49. Connected to test port or port is a standard gas particle tester. Measuring particle levels in a conventional gas pluming system is a difficult task. The measurement of particles, in a conventional gas plumbing system, requires opening up of the gas plumbing system which exposes the gas plumbing system to contamination,as well as, compromising the integrity of the system. This invention, by having the suitable test ports and connections, provides the ability to quickly isolate a problem, as well as, statistically monitor the gas system for particle levels. Additionally, direct particle levels from process gases can also be measured.

By having a plurality of test ports located along exhaust tube 40, simultaneous monitoring of different parameters of the gas system is accomplished. This capability is important in identifying parameters such as particles, moisture levels, residual gases or the like.

Vacuum integrity checks are greatly simplified by using this invention. Helium leak detection systems are well known in the art. A helium leak detector is connected to either port 53 or 49. A vacuum is then drawn through the entire system. Helium is then applied around every joint and component of the system. If there is a leak, helium enters the plumbing system and travels to the helium detector where an alarm is sounded. Another method for isolating a leak is to pressurize the gas plumbing system with helium and then look for escaping helium with a probe attached to the helium leak detector. By using this design an ability is provided to quickly detect leaks without compromising the integrity of the system.

By now it should be appreciated that there has been provided a novel apparatus and method for manufacturing a gas plumbing system. It should also be appreciated that this approach greatly simplifies maintenance procedures for leak detection and particle detection. Additionally, this invention provides for in situ calibration of metering devices without the need to remove the metering devices.

We claim:

1. A gas manifold apparatus for in situ calibration of a metering device comprising:

a calibrated gas inlet with a calibrated gas;

a first three way valve, with a first connection that is connected to the calibrated gas inlet, a second connection, and a third connection that is connected to a second gas source;

a metering device with at least one inlet and one outlet, which has the inlet connected to the second connection of the first three way valve so as to allow the calibrated gas to pass through the second connection of the first three way valve and into the metering device;

a second three way valve, which has a first connection to the outlet of the metering device, a second connection that is connected to an exhaust, and a third connection that is connected to a reaction chamber, so that the calibrated gas flows through the metering device so that the metering device is calibrated to the calibrated gas; and an uncalibrated gas source which is connected to a cut off valve and a two way valve, the cut off valve is further connected to a calibration test fixture, the calibration test fixture is connected to the calibrated gas inlet, so that a gas flowing from the uncalibrated gas source can flow through the cut off valve through the calibration test fixture, and into the calibrated gas inlet.

2. A method for in situ calibrating a mass flow controller (MFC) without removing the MFC from an operating gas manifold arrangement comprising:

providing a calibrated gas inlet having a calibrated gas;

providing a three way valve which has one connection to the calibrated gas inlet and a second connection;

providing a metering device with at least one inlet and one outlet which has the metering device inlet connected to the second connection of the three way valve;

allowing the calibrated gas to pass through the calibrated gas inlet, through the three way valve, through the metering device, so that the metering device is calibrated to the calibrated gas; and an uncalibrated gas source having an uncalibrated gas which is connected to a cut off valve and to a two way valve, the cut off valve is further connected to calibration test fixture and the two way valve is further connected to both the three way valve and to the calibrated gas inlet, so that closing the two way valve diverts the uncalibrated gas to flow out of the cut off valve through the calibration fixture and into the calibrated gas inlet, thereby supplying a calibrated gas to calibrate the metering device.

* * * * *